United States Patent
Toyota et al.

(10) Patent No.: US 10,941,250 B2
(45) Date of Patent: Mar. 9, 2021

(54) ANTISTATIC MATERIAL, METHOD FOR PRODUCING SAME, AND ANTISTATIC FILM

(71) Applicant: Panasonic Intellectual Property Management Co., Ltd., Osaka (JP)

(72) Inventors: Kei Toyota, Osaka (JP); Kazuma Oikawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 56 days.

(21) Appl. No.: 16/076,012

(22) PCT Filed: Feb. 17, 2017

(86) PCT No.: PCT/JP2017/005864
§ 371 (c)(1),
(2) Date: Aug. 7, 2018

(87) PCT Pub. No.: WO2017/154515
PCT Pub. Date: Sep. 14, 2017

(65) Prior Publication Data
US 2019/0256661 A1     Aug. 22, 2019

(30) Foreign Application Priority Data

Mar. 11, 2016 (JP) .............................. JP2016-048771

(51) Int. Cl.
*C09K 3/16* (2006.01)
*C08G 77/20* (2006.01)
(Continued)

(52) U.S. Cl.
CPC ............. *C08G 77/20* (2013.01); *C08G 59/20* (2013.01); *C08G 77/04* (2013.01); *C08G 77/18* (2013.01);
(Continued)

(58) Field of Classification Search
None
See application file for complete search history.

(56) References Cited

U.S. PATENT DOCUMENTS 6,005,705 A * 12/1999 Schmidt ................. C08G 77/46
252/519.31
8,852,737 B2 * 10/2014 Kawaguchi .......... C09D 183/04
428/331
(Continued)

FOREIGN PATENT DOCUMENTS

JP     59-012550     1/1984
JP     59-015183     1/1984
(Continued)

OTHER PUBLICATIONS

Pan et al. "Preparation and properties of PEO/LICIO4/KH560—SiO2 composite polymer electrolyte by sol-gel composite-in-situ method" J. Cent. South Univ. Technol. 2008, 15, 295-300. (Year: 2008).*

(Continued)

*Primary Examiner* — Robert S Loewe
(74) *Attorney, Agent, or Firm* — Wenderoth, Lind & Ponack, L.L.P.

(57) ABSTRACT

Provided is an antistatic material that contains a mixture of first alkoxysilane that contains at least one alkoxy group and at least one polymerizable organic functional group, second alkoxysilane that contains at least one alkoxy group and does not contain a polymerizable organic functional group, a solvent, an acidic catalyst, and an ionic compound.

19 Claims, 4 Drawing Sheets

(51) Int. Cl.
*C08G 77/18* (2006.01)
*C08J 5/18* (2006.01)
*C08K 3/16* (2006.01)
*C08G 77/04* (2006.01)
*C08G 59/20* (2006.01)
*C09D 183/06* (2006.01)
*C08G 77/14* (2006.01)

(52) U.S. Cl.
CPC .............. *C08J 5/18* (2013.01); *C08K 3/16* (2013.01); *C09D 183/06* (2013.01); *C09K 3/16* (2013.01); *C08G 77/14* (2013.01); *C08K 2201/017* (2013.01)

(56) References Cited

U.S. PATENT DOCUMENTS

| | | | |
|---|---|---|---|
| 2003/0129421 A1 | 7/2003 | Terauchi et al. | |
| 2004/0058147 A1 | 3/2004 | Ozawa et al. | |
| 2004/0214015 A1* | 10/2004 | Asai | C03C 17/30 428/429 |
| 2007/0031660 A1 | 2/2007 | Kanamaru et al. | |
| 2007/0196567 A1* | 8/2007 | Kojima | C08J 7/047 427/162 |
| 2007/0224427 A1* | 9/2007 | Kunita | C03C 17/32 428/420 |
| 2008/0286457 A1* | 11/2008 | Mitsuishi | C09D 183/06 427/164 |
| 2010/0074584 A1* | 3/2010 | Jin | G02B 6/13 385/123 |
| 2010/0184913 A1 | 7/2010 | Ebbrecht et al. | |
| 2010/0221556 A1* | 9/2010 | Koyama | B82Y 30/00 428/446 |
| 2010/0239872 A1* | 9/2010 | Koyama | B82Y 30/00 428/448 |
| 2011/0317239 A1* | 12/2011 | Mori | C08G 77/14 359/241 |
| 2012/0077047 A1 | 3/2012 | Asahi et al. | |
| 2013/0274381 A1* | 10/2013 | Hugenberg | C09D 183/06 523/456 |
| 2017/0015860 A1* | 1/2017 | Kodaira | C03C 17/326 |

FOREIGN PATENT DOCUMENTS

| | | |
|---|---|---|
| JP | 2002-128898 | 5/2002 |
| JP | 2003-201444 | 7/2003 |
| JP | 2004-058562 | 2/2004 |
| JP | 2007-070611 | 3/2007 |
| JP | 2010-083993 | 4/2010 |
| JP | 2010-106096 | 5/2010 |
| JP | 2010-132903 | 6/2010 |
| JP | 2010-160464 | 7/2010 |
| JP | 2012-215819 | 11/2012 |
| WO | WO-2015152050 A1 * 10/2015 | ............... C09D 7/63 |

OTHER PUBLICATIONS

International Search Report of PCT application No. PCT/JP2017/005864 dated Apr. 4, 2017.

* cited by examiner

ANTISTATIC MATERIAL, METHOD FOR PRODUCING SAME, AND ANTISTATIC FILM

This application is a U.S. national stage application of the PCT International Application No. PCT/JP2017/005864 filed on Feb. 17, 2017, which claims the benefit of foreign priority of Japanese patent application 2016-048771 filed on Mar. 11, 2016, the contents all of which are incorporated herein by reference.

TECHNICAL FIELD

The present disclosure relates to a material capable of forming an antistatic film, such as a film that has an antistatic function, a method for producing the same, and an antistatic film.

BACKGROUND ART

There is a concern that static electricity generated by insulators being charged may be generated in a variety of scenes in everyday lives, social lives, and product mass production sites. For example, there is a case in which elements on a substrate are destroyed due to static electricity generated between a charged component transport jig and the circuit substrate during assembly of the circuit substrate. In another example, electric discharge occurs at a moment at which a charged PVA film departs from a roll made of metal when a polarization film for an LCD is produced and the PVA film is made to pass through the roll, and this may lead to defects in pin hole formation or the like. Thus, antistatic materials that prevent occurrence of static electricity for the purpose of previously preventing these defects have been considered and put into practical use as antistatic agents in the related art.

In particular, examples of the antistatic agents that exhibit an antistatic function by being applied to surfaces of products or base materials to form films, such as an antistatic agent that causes a hydrophobic surface to be hydrophilic by a surfactant, thereby facilitating adsorption of water molecules in the air, an antistatic agent that is obtained by blending an ion conducting material mainly with a polymer material such as synthesized resin and prevents charging by causing electrons accumulated on the surface thereof to escape by the ion conductivity, and an antistatic agent that is obtained by dispersing fine particles of a conductive substance, representative examples of which include metal, and an oxide thereof in synthesized resin are known.

For example, PTL 1 (Japanese Patent Unexamined Publication No. 2010-083993) discloses an antistatic agent using a surfactant that has an antistatic function.

PTL 2 (Japanese Patent Unexamined Publication No. 2010-106096) discloses an antistatic laminated polyester film that has, on a polyester film, a coating film that is formed of a composition containing a nonionic acrylic copolymer, an antistatic agent, a surfactant that contains, as a main component, polyoxyalkylene phenyl ether with a side chain of a phenyl group substituted with a plurality of substituents including an aromatic ring.

PTL 3 (Japanese Patent Unexamined Publication No. 2010-160464) discloses an antistatic hard coating film that contains an ion conducting material and discloses a combination use of a quaternary ammonium salt-based conductive monomer that has an ion conducting mechanism and a π-conjugated conductive polymer that has an electron conducting mechanism, as an ion conducting material.

PTL 4 (Japanese Patent Unexamined Publication No. 2012-215819) discloses an antistatic hard coating layer forming composition that contains an ion conductive compound, a polyethylene oxide compound having one or more photopolymerizable group, a compound having an unsaturated double bond, and a photopolymerization initiator.

Alternatively, PTL 5 (Japanese Patent Unexamined Publication No. 2004-058562) discloses, as a configuration using fine particles of a conductive substance or an oxide thereof, an antistatic film that is obtained by forming a layer of a mixture of a metal oxide and conductive ultrafine particles on the surface of the film and that has a surface resistivity of $10^{13} \Omega$/square (ohms per square) or less.

CITATION LIST

Patent Literature

PTL 1: Japanese Patent Unexamined Publication No. 2010-083993
PTL 2: Japanese Patent Unexamined Publication No. 2010-106096
PTL 3: Japanese Patent Unexamined Publication No. 2010-160464
PTL 4: Japanese Patent Unexamined Publication No. 2012-215819
PTL 5: Japanese Patent Unexamined Publication No. 2004-058562

SUMMARY OF THE INVENTION

It is believed that the surface resistivity of an antistatic film is preferably within a range of equal to or greater than $10^5 \Omega$/square and less than $10^{10} \Omega$/square. In a case in which the surface resistivity is less than $10^5 \Omega$/square, conductivity occurs, and there is thus a concern in which an unnecessary noise current is generated. In a case in which the surface resistivity is equal to or greater than $10^{10} \Omega$/square, insulation properties of the film increase, and a desired antistatic function is thus not obtained in some cases.

Since many antistatic films greatly depend on conductivity and ion conductivity, the antistatic films are easily affected by humidity. In particular, low humidity may cause the surface resistivity to be equal to or greater than $10^{10} \Omega$/square, and a sufficient antistatic function cannot be obtained in some cases.

Thus, an object of the present disclosure is to provide a material capable of forming an antistatic film such as a film that has an excellent antistatic function, in particular, a material capable of forming an antistatic film with surface resistivity that is hardly affected by humidity, a method for producing the same, and an antistatic film in view of the aforementioned problems.

As a result of extensive researches, the present inventors have discovered that it is possible to form an antistatic film that has an excellent antistatic function, in particular, an antistatic film with surface resistivity that is hardly affected by humidity by mixing and using at least two kinds of alkoxysilane, which will be described later in detail, and the inventors have achieved the present disclosure.

Although the present disclosure can provide the following antistatic material, a method for producing an antistatic material, and an antistatic film, the present disclosure is not limited to those described below.

(Antistatic Material)

An antistatic material according to the present disclosure includes a mixture of first alkoxysilane that contains at least one alkoxy group and at least one polymerizable organic functional group, second alkoxysilane that contains at least one alkoxy group and does not contain a polymerizable organic functional group, a solvent, an acidic catalyst, and an ionic compound.

(Method for Producing Antistatic Material)

A method for producing an antistatic material according to the present disclosure includes mixing first alkoxysilane, second alkoxysilane, a catalyst, a solvent, and an ionic compound.

(Antistatic Film)

An antistatic film according to the present disclosure is formed of the antistatic material according to the present disclosure.

The present disclosure can provide a material capable of forming an antistatic film such as a film that has an excellent antistatic function, in particular, an antistatic film with surface resistivity that is hardly affected by humidity and a method for producing the same. The antistatic material according to the present disclosure can provide an antistatic film that is hardly affected by humidity and can stably prevent a solid surface from being charged.

DESCRIPTION OF EMBODIMENT

Figure 1:
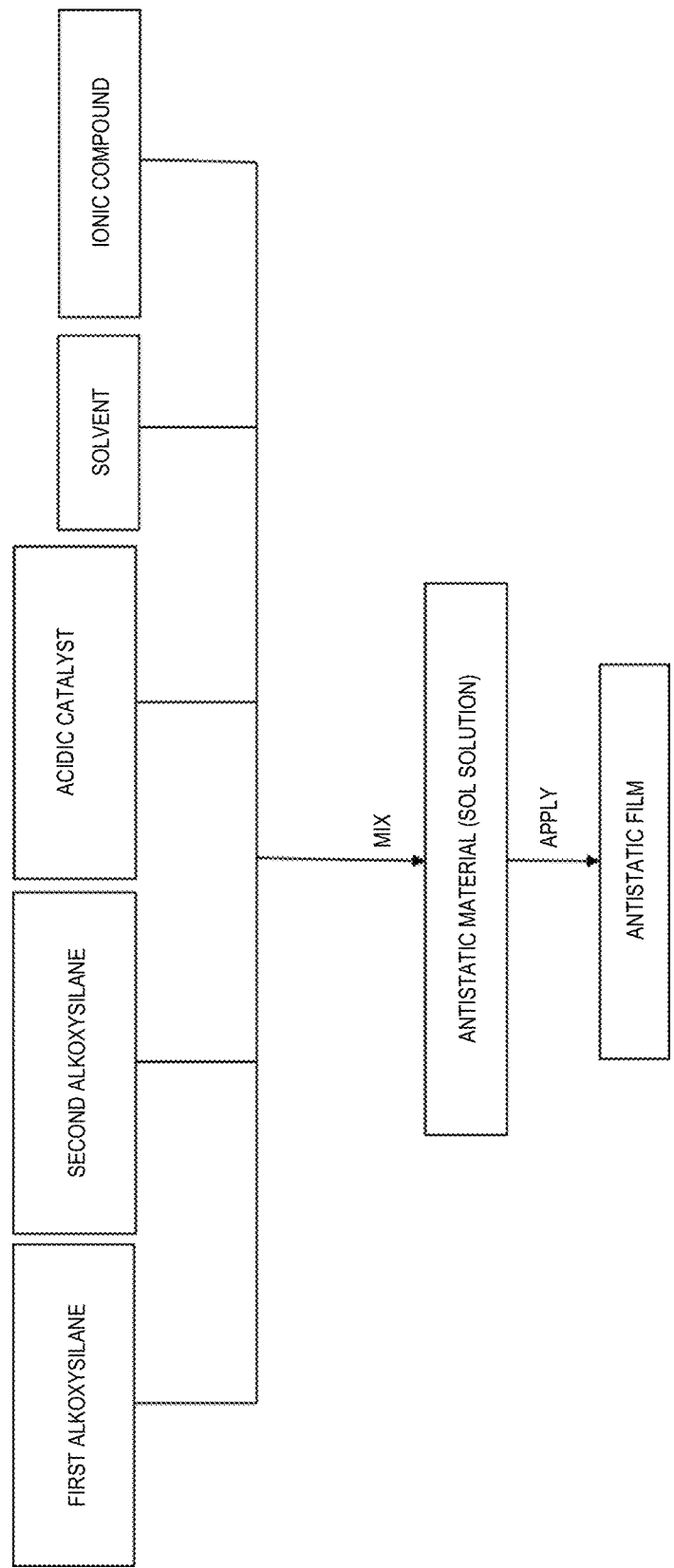
FIG. 1 is an outline diagram illustrating a method for producing an antistatic material.

FIG. 1 is an outline diagram illustrating a method for producing an antistatic material. As illustrated in FIG. 1, the antistatic material according to the present disclosure can be produced by mixing the "first alkoxysilane", the "second alkoxysilane", the "acidic catalyst", the "solvent", and the "ionic compound".

As will be described below in detail, the "first alkoxysilane" is an organic silane compound that contains at least one alkoxy group and at least one polymerizable organic functional group while the "second alkoxysilane" is an organic silane compound that contains at least one alkoxy group and does not contain a polymerizable organic functional group.

By mixing both the first alkoxysilane and the second alkoxysilane in presence of the acidic catalyst, the alkoxy groups thereof can form an inorganic network based on a siloxane bond (Si—O bond). The polymerizable organic functional group of the first alkoxysilane can form an organic network by being polymerized in presence of the ionic compound.

According to the present disclosure, it is possible to form an antistatic film capable of exhibiting an excellent antistatic function based on an organic-inorganic hybrid structure, in particular, an antistatic film that is hardly affected by humidity by applying an antistatic material that can be formed from such first alkoxysilane and second alkoxysilane to a base body and curing the antistatic material.

In the following description in this specification, a sol solution that includes the aforementioned organic-inorganic hybrid structure that can be formed from the first alkoxysilane and the second alkoxysilane will be referred to as the "antistatic material", and a film, such as a film that can be formed from such an antistatic material, will be referred to as the "antistatic film".

The antistatic film according to the present disclosure has surface resistivity of equal to or greater than $1.0 \times 10^5 \Omega$/square and less than $1.0 \times 10^{10} \Omega$/square, or preferably equal to or greater than $1.0 \times 10^5 \Omega$/square and less than $1.0 \times 10^8 \Omega$/square, for example, and can stably suppress occurrence of static electricity in accordance with a change in humidity, on the basis of the organic-inorganic hybrid structure.

The antistatic film according to the present disclosure has tensile elasticity of equal to or greater than 30 MPa and less than 100 MPa, or preferably equal to or greater than 30 MPa and less than 50 MPa, for example, and has excellent flexibility, on the basis of the organic-inorganic hybrid structure.

The antistatic film according to the present disclosure has a transmittance of 85% or greater, or more preferably 90% or more of light (wavelength of 550 nm) and has excellent transparency, on the basis of the organic-inorganic hybrid structure.

(1) Raw Materials of Antistatic Material

Hereinafter, the "first alkoxysilane", the "second alkoxysilane", the "acidic catalyst", the "solvent", and the "ionic compound" that can be used in the present disclosure will be described in detail.

<First Alkoxysilane>

The "first alkoxysilane" is an organic silane compound that contains at least one "alkoxy group" and at least one "polymerizable organic functional group".

Examples of the "alkoxy group" in the first alkoxysilane include a linear or branched alkoxy group having 1 to 5 carbon atoms (for example, a methoxy group, an ethoxy group, an n-propoxy group, an isopropoxy group, an n-butoxy group, an isobutoxy group, a 1-methylpropoxy group, a tert-butoxy group, an n-pentoxy group, an isopentoxy group, a 1-methylbutoxy group, a 2-methylbutoxy group, a tert-pentoxy group). In a case in which the first alkoxysilane has two or more "alkoxy groups", the alkoxy groups may be the same or different.

The alkoxy group in the first alkoxysilane can form an inorganic network based on a siloxane bond between the first alkoxysilanes or between the first alkoxysilane and the second alkoxysilane, which will be described later in detail, in presence of the acidic catalyst, which will be described later in detail. Therefore, a methoxy group and an ethoxy group are particularly preferable from among the alkoxy groups from a viewpoint that hydrolysis easily occurs and reaction can be easily controlled. If the number of carbon atoms of the alkoxy group exceeds 5, it becomes difficult for molecules to approach one another due to steric barrier thereof, and there is a concern that polymerization of the "polymerizable organic functional group", which will be described later, in detail is interrupted.

Examples of the "polymerizable organic functional group" in the first alkoxysilane include an organic functional group that includes a "polymerizable reaction site" that includes a "cyclic ether bond", a "double bond", a "triple bond", and the like (hereinafter, also referred to as "polymeric reaction site"), and there is no particular limitation as long as the polymerizable organic functional group follows organic chemistry.

The total number of carbon atoms in the "polymerizable organic functional group" ranges from 2 to 20, for example, preferably ranges from 2 to 9, or more preferably ranges from 2 to 6.

The number of carbon atoms in the "polymerizable reaction site" ranges from 2 to 10, for example, more preferably ranges from 2 to 6, or more preferably ranges from 2 to 3.

Examples of the polymerizable reaction site that contains a "cyclic ether bond" include a reaction group having 2 to 6 carbon atoms and containing an epoxy bond (for example, an epoxy group, a glycidoxy group, or an epoxycyclohexyl group). In particular, a glycidoxy group and an epoxycyclohexyl group are preferably used. These reaction groups that contain a cyclic ether bond can form a polyether structure through ring-opening polymerization or the like thereof.

Examples of the polymerizable reaction site that contains a "double bond" include a reaction group having 2 to 8 carbon atoms and containing a vinyl bond (for example, a vinyl group, an allyl group, a styryl group, an acrylate group, or methyl methacrylate group). In particular, a vinyl group is preferably used. These reaction groups that contain a double bond can form a polyolefin structure through ion polymerization or the like.

Examples of the polymerizable reaction site that contains a "triple bond" include a reaction group having 2 to 4 carbon atoms and containing an acetylene bond or a cyan bond (for example, an alkynyl group, cyano group). In particular, an alkynyl group is preferably used. These reaction groups that contain a triple bond can form a polyolefin structure or the like through ion polymerization or the like.

The aforementioned polymerizable reaction site may be bonded directly to a silicon atom or may be bonded to a silicon atom via an "organic linking group" (or a linker), in the first alkoxysilane.

The "organic linking group" is not particularly limited as long as the organic linking group follows organic chemistry, and the number of carbon atoms ranges from 1 to 15, for example, preferably ranges from 2 to 10, or more preferably ranges from 3 to 6, and examples thereof include a hydrocarbon group having 3 to 6 carbon atoms (for example, an alkylene group).

Here, the "polymerizable organic functional group" that the first alkoxysilane has can be represented by a formula: A—B— [in the formula, A represents the aforementioned polymerizable reaction site, and B represents a single bond or the aforementioned organic linking group].

Two or more polymerizable organic functional groups may be present in the first alkoxysilane, and in the case, the polymerizable organic functional groups may be the same or different.

Further, the silicon atom in the first alkoxysilane may have "another organic group" in addition to the aforementioned "alkoxy group" and the "polymerizable organic functional group" in accordance with organic chemistry and science of the silicon atom (however, in this case, the total number of the "alkoxy group", the "polymerizable organic functional group", and "another organic group" in the silicon atom in the first alkoxysilane is four).

"Another organic group" that the first alkoxysilane may have is not particularly limited as long as another organic group follows organic chemistry, and it is desirable to use an organic group having 1 to 12 carbon atoms, for example, preferably 1 to 8 carbon atoms, or more preferably 1 to 2 carbon atoms and not substantially involved in formation of a siloxane bond of the aforementioned "alkoxy group" and polymerization of the aforementioned "polymerizable organic functional group".

Examples of "another organic group" include a hydrocarbon group having 1 to 12 carbon atoms. The aforementioned hydrocarbon group may be any of linear, branched, and cyclic hydrocarbon groups, and examples thereof include an alkyl group having 1 to 8 carbon atoms (for example, a methyl group, an ethyl group, a propyl group, an isopropyl group, a butyl group, a t-butyl group, a pentyl group, a hexyl group, a heptyl group, and or an octyl group).

Preferable examples of an alkyl group include a methyl group and an ethyl group with low bulk density from the viewpoint of a steric barrier. If the number of carbon atoms in the aforementioned alkyl group is equal to or less than 8, the steric barrier becomes small, and polymerization tends to be able to easily advance.

Such "first alkoxysilane" can be represented by Formula (I): $(R^1O)_a(R^2O)_b(R^3O)_cSi(X)_d(Y)_e(Z)_f$.

In the formula, $R^1O$, $R^2O$, and $R^3O$ each independently represent the aforementioned "alkoxy group", X, Y, and Z each independently represent the aforementioned "polymerizable organic functional group (preferably, a group represented by the aforementioned formula: A—B— [in the formula, A represents the aforementioned polymerizable reaction site, and B represents a single bond or the aforementioned organic linking group]) or aforementioned "another organic group". However, at least one of X, Y, and Z is the aforementioned "polymerizable organic functional group", and the aforementioned at least one "polymerizable organic functional group" is necessarily present in the first alkoxysilane. a, b, c, d, e, and f each independently represent any one of integers 0, 1, 2, and 3, a+b+c is any one of integers 1, 2, and 3, d+e+f represents any one of integers 1, 2, and 3, and a+b+c+d+e+f represents an integer 4.

As the first alkoxysilane represented by Formula (I), it is preferable to use 3-glycidoxypropyltrimethoxysilane, 3-glycidoxypropylmethydimethoxysilane, vinyltrimethoxysilane, 2-(3,4-epoxycyclohexyl)ethyltrimethoxysilane, or the like.

The first alkoxysilane may be used as a mixture of a combination of two or more of the aforementioned alkoxysilanes, for example. In this case, alkoxysilanes to be combined may be the same or different. In this case, use of a material in which a+b+c represented by aforementioned Formula (I) is an integer 2 to 3 enables formation of an antistatic film with excellent flexibility.

<Second Alkoxysilane>

The "second alkoxysilane" is an organic silane compound that contains at least one alkoxy group and does not contain a polymerizable organic functional group. Here, the expression "does not contain a polymerizable organic functional group" means that the organic silane group does not have a group that contains a polymerizable reaction site based on organic chemistry, and in a narrow sense, it means that the organic silane group does not contain the aforementioned "polymerizable organic functional group" in the first alkoxysilane.

Examples of the "alkoxy group" in the second alkoxysilane include a linear or branched alkoxy group having 1 to 5 carbon atoms (for example, a methoxy group, an ethoxy group, an n-propoxy group, an isopropoxy group, an n-butoxy group, an isobutoxy group, a 1-methylpropoxy group, a tert-butoxy group, an n-pentoxy group, an isopentoxy group, a 1-methylbutoxy group, a 2-methylbutoxy group, or a tert-pentoxy group). In a case in which the second alkoxy silane has two or more "alkoxy groups", the alkoxy groups may be the same or different.

The alkoxy group in the second alkoxysilane can form an inorganic network based on a siloxane bond between second alkoxysilanes or between the second alkoxysilane and the first alkoxysilane in presence of acidic catalyst, which will be described later in detail. Therefore, a methoxy group and an ethoxy group are particularly preferably used from among the alkoxy groups from a viewpoint that hydrolysis thereof easily occurs and the reaction can be easily controlled.

The second alkoxysilane may have a "non-polymeric group" in addition to the aforementioned alkoxy group.

The second alkoxysilane may have any "non-polymeric group" as long as the organic group does not have polymeric properties, and the non-polymeric group is not particularly limited as long as the non-polymeric group follows organic chemistry. It is desirable to use an organic group having 1 to 20 carbon atoms, for example, preferably having 1 to 12 carbon atoms, or more preferably having 1 to 6 carbon atoms and not being substantially involved in formation of a silloxane bond of the aforementioned "alkoxy group" and polymerization of the aforementioned "polymerizable organic functional group".

Examples of the "non-polymeric group" that the second alkoxysilane may have included a hydrocarbon group having 1 to 20 carbon atoms. The hydrocarbon group may be any one of linear, branched and cyclic hydrocarbon groups, and examples thereof include an alkyl group having 1 to 20 carbon atoms (for example, a methyl group, an ethyl group, a propyl group, an isopropyl group, a butyl group, a t-butyl group, a pentyl group, a hexyl group, a cyclohexyl group, a heptyl group, an octyl group, or a decyl group) and an aryl group having 1 to 20 carbon atoms (for example, a phenyl group). If the number of carbon atoms in the hydrocarbon group exceeds 20, the steric barrier thereof becomes large, and polymerization tends to be able to be inhibited.

Such "second alkoxysilane" can be represented by Formula (II): $(R^4O)_g(R^5O)_h(R^6O)_iSi(P)_j(Q)_k(R)_l$.

In the formula, $R^4O$, $R^5O$, and $R^6O$ each independently represent the aforementioned "alkoxy group", P, Q, and R each independently represent the aforementioned "non-polymeric group, g, h, i, j, k, and l each independently represent any of integers 0, 1, 2, 3, and 4 (where j, k, and l are not integer 4 in any cases), g+h+i represent any of integers 1, 2, 3, and 4, j+k+l is any of integers 0, 1, 2, and 3, and g+h+i+j+k+l represents an integer 4.

As the second alkoxysilane represented by Formula (II), it is preferable to use methyltrimethoxysilane, dimethyldimethoxysilane, phenyltrimethoxysilane, or the like.

The second alkoxysilane may be used as a mixture of a combination of two or more of the aforementioned alkoxysilanes. In this case, the combined alkoxysilanes may be the same or different. If a material in which g+h+i represented by aforementioned Formula (II) is an integer 2 is used, for example, in this case, it is possible to introduce a linear part into a three-dimensional skeleton, for example, and to form an antistatic film with excellent flexibility.

<Third Alkoxysilane>

In the present disclosure, third alkoxysilane may be used as needed along with the first akoxysilane and the second alkoxysilane.

The third alkoxysilane has at least one "alkoxy group" and at least one "organic group", which will be defined below.

The "alkoxy group" that the third alkoxysilane has is as defined for the alkoxy group that the aforementioned first or second alkoxysilane has. In a case in which the third alkoxysilane has a plurality of alkoxy groups, the alkoxy groups may be the same or different.

The "organic group" that the third alkoxysilane has is an amino group that may have a substituent, a mercapto group (thiol group) that may have a substituent, a linear, branched, or cyclic hydrocarbon group having 1 to 20 carbon atoms and containing at least one of a —NH— bond, a =N— bond, and the like (for example, an alkyl group having 1 to 20 carbon atoms (for example, a methyl group, an ethyl group, a propyl group, an isopropyl group, a butyl group, a t-butyl group, a pentyl group, a hexyl group, a cyclohexyl group, a heptyl group, an octyl group, or a decyl group), or an allyl group having 1 to 20 carbon atoms (a phenyl group, for example)). The substituents and the number thereof that the amino group and the mercapto group may have are not particularly limited. Preferable examples of such an organic group include a mercaptopropyl group, an aminoethyl group, an aminopropyl group, an N-2-(aminoethyl)-3-aminopropyl group, an N-(1,3-dimethyl-butylidene) propylamino group, and an N-phenyl-3-aminopropyl group. Since the thiol group or the amino group contained in the third alkoxysilane can promote polymerization of a cyclic ether structure that can be contained in the first alkoxysilane, for example, it is preferable to use the thiol group or the amino group in combination with the first alkoxysilane that contains the cyclic ether structure.

The third alkoxysilane may have not only the aforementioned "alkoxy group" and "organic group" but also the "non-polymeric group" defined for the second alkoxysilane.

Such third alkoxysilane can be represented by Formula (III); $(R^7O)_m(R^8O)_n(R^9O)_oSi(S)_p(T)_q(U)_r$.

In the formula, $R^7O$, $R^8O$, and $R^9O$ each independently represent the aforementioned "alkoxy group", and S, T, and U each independently represent the aforementioned "organic group" or the aforementioned "non-polymeric group". However, at least one of S, T, and U represents the aforementioned "organic group", the aforementioned at least one "organic group" is necessarily present in the third alkoxysilane, m, n, o, p, q, and r each independently represent any of integers 0, 1, 2, and 3, m+n+o represents any of integers 1, 2, and 3, p+q+r represents any of integers 1, 2, and 3, and m+n+o+p+q+r represents an integer 4.

As the third alkoxysilane represented by Formula (III), it is preferable to use N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, 3-mercaptopropylmethyldimethoxysilane, 3-mereaptopropyltrimethoxysilane, or the like.

<Ionic Compound>

In the present disclosure, it is possible to polymerize the polymerizable organic functional group in the first alkoxysilane by the ionic compound, which will be described later in detail, in parallel with the polymerization (formation of a siloxane bond) between the alkoxy groups in the first alkoxysilane, between alkoxy groups in the second alkoxysilane, and between alkoxy groups in the first and second alkoxysilanes.

In the present disclosure, the ionic compound is not particularly limited as long as the compound exhibits ionic properties or can provide ions, and the ionic compound may be ions themselves. The ionic compound includes a compound that has electron-donating properties and is an oxidant, a compound that has electron-accepting properties and is a reductant, and the like.

Examples of the electron-donating compound include ammonium ions, phosphonium ions, and sulfide ions.

Examples of the electron-accepting compound includes: halogen and halide such as chlorine, bromine, iodine, iodine monochloride, iodine trichloride, iodine bromide, and iodine fluoride; proton acids such as hydrogen fluoride, hydrogen chloride, a nitric acid, a sulfuric acid, and a perchloric acid; a variety of organic acids such as a fluorosulfonic acid, a chlorosulfonic acid, and a trifluoromethane sulfonic acid; an amino acid; chloride ions, bromide ions, iodide ions, perchloric acid ions, hexafluorophosphate ions, $AsF_6^-$, $SbF_6^-$, and tetrafluoroborate ions as electrolyte anions; perchlorate such as lithium perchlorate, sodium perchlorate, and potassium perchlorate, and organic metal such as butyl lithium.

It is possible to preferably use perchlorate such as lithium perchlorate, sodium perchlorate, or potassium perchlorate from the viewpoint that such perchlorate exhibits high solubility in the sol solution, which will be described later, and is easily used, in particular.

<Acidic Catalyst>

In the present disclosure, the acidic catalyst can be used for quickly promoting hydrolysis and dehydration condensation of the alkoxy groups in the first and second alkoxysilanes, and any known acidic catalyst can be used as long as it can act as a catalyst for a typically known sol-gel reaction.

Examples thereof include a hydrochloric acid (hydrochloric acid), a hydrobromic acid, a hydroiodic acid, a sulfuric acid, a sulfonic acid, a nitric acid, a phosphoric acid, a boric acid, an acetic acid, a citric acid, a formic acid, and a tartaric acid. The amount of use thereof is also not particularly limited.

<Solvent>

The solvent is not particularly limited, and a known solvent that can be used for a sol-gel reaction can be used. Examples thereof include water, methanol, ethanol, isopropanol, and acetone. It is preferable to use a polar solvent such as water for the purpose of causing hydrolysis of the alkoxy group in alkoxysilane. The amount of use thereof is not particularly limited.

(2) Preparation of Sol Solution and Polymerization of Polymerizable Organic Functional Group In a preferred embodiment of the present disclosure, an antistatic material is a transparent sol solution obtained by mixing the first alkoxysilane, the second alkoxysilane, the acidic catalyst, the ionic compound, and the solvent in a liquid phase containing them, preferably mixing the first alkoxysilane, the second alkoxysilane, the acidic catalyst, the ionic compound, and the solvent while heating and stirring them such that a part of the respective alkoxy groups bonded to the first alkoxysilane and the second alkoxysilane is polymerized through hydrolysis and dehydration condensation to form a siloxane bond and at least a part or preferably entirety of the polymerizable organic functional group in the first alkoxysilane is polymerized by the ionic compound. If such a sol solution is applied to a base body such as a solid, for example, residual alkoxy groups cause hydrolysis and dehydration condensation due to humidity in the air and are thus hardened, thereby forming a transparent antistatic film.

<Preparation of Sol Solution>

For preparing the sol solution, the aforementioned first alkoxysilane, second alkoxysilane, ionic compound, acidic catalyst, and solvent are mixed. As a molar ratio, the first alkoxysilane, second alkoxysilane, ionic compound, acidic catalyst, and solvent are blended such that a value of a ratio (first alkoxysilane)/(second alkoxysilane) ranges from 0.2 to 10, for example. If the ratio is less than 0.2, the number of polymerizable organic functional groups in the first alkoxysilane decreases, and the surface resistivity of the final cured article does thus not sufficiently become small in some cases. If the ratio is greater than 10, an influence of polymerization chains formed by the polymerizable organic functional groups being polymerized with respect to the entirety increases, and contraction or cracking thus occurs due to the curing in some cases.

The amount of acidic catalyst added can be appropriately adjusted, and an effective amount of addition thereof is equal to or greater than 0.1% and equal to or less than 10% of the total molar number of the alkoxy groups contained in the first alkoxysilane and the second alkoxysilane, for example. If the amount is smaller than 0.1%, the effect of promoting the reaction cannot be obtained in some cases. If the amount is greater than 10%, the reaction speed excessively increases, and it becomes difficult to control the reaction in some cases. The amount of catalyst added is preferably equal to or greater than 0.5% and equal to or less than 1% with respect to the total molar number of the alkoxy groups from the viewpoint that it is possible to more easily control the reaction and to stably promote the hydrolysis and the dehydration condensation of the alkoxy groups.

Although the amount of ionic compound added can be appropriately adjusted, it is possible to set the amount to be equal to or greater than 1% and equal to or less than 50% with respect to the molar number of the polymerizable organic functional group. If the amount of addition thereof is less than 1%, the surface resistivity does not sufficiently become low, and a sufficient antistatic function is not achieved in some cases. If the amount is greater than 50%, the ionic compound is not completely dissolved in the sol solution, an unsolved ionic compound precipitates, and the antistatic function becomes unstable in some cases.

The amount of solvent added is not particularly limited, and in a case in which the solvent is water, it is possible to blend the solvent with a molar number of at least equal to or greater than 1 time and equal to or less than 5 times of the sum of the molar number of the alkoxy group contained in the first alkoxysilane and the molar number of the alkoxy group contained in the second alkoxysilane. If the molar number is less than 1 time, the hydrolysis of the alkoxy group does not quickly advance, and productivity deteriorates in some cases. If water with a molar number of greater than 5 times, the concentration of the first alkoxysilane and the second alkoxysilane blended becomes low, and reaction efficiency decreases in some cases. It is preferable to add water with a molar number of equal to or greater than 2 times and equal to or less than 3 times of the molar number of all the alkoxy groups from the viewpoint that the reaction is to be quickly promoted.

In the formulations as described above, the first alkoxysilane, the second alkoxysilane, the solvent, the acidic catalyst, and the ionic compound are mixed by stirring them preferably while heating them, a siloxane bond is formed through the hydrolysis and the dehydration condensation of the alkoxy groups during this process, and in parallel with this, and the ionic compound is made to polymerize the polymerizable organic functional group in the first alkoxysilane, thereby preparing the sol solution. The stirring while heating can be performed by using a known heating method and a known stirring method and can be performed by a motor stirring blade or a magnetic stirrer. The heating may be performed by installing the container in a water bath or a mantle heater, or may be performed by installing the container on a hot stirrer. The heating temperature is preferably equal to or greater than 60° C. and equal to or less than 90° C. for the purpose of sufficiently vaporizing water, which eventually becomes unnecessary, while causing the hydrolysis of the alkoxy group to advance. It is possible to sufficiently vaporize water used for the hydrolysis of the alkoxy groups or water generated in the dehydration condensation in a case in which the solvent is water, for example, by setting the temperature to be equal to or greater than 60° C. and equal to or less than 90° C.

In the first alkoxysilane and the second alkoxysilane mixed by using the aforementioned raw materials and following the aforementioned procedures and formulation amounts as described above, a part of the respective alkoxy groups is polymerized and then causes hydrolysis and dehydration condensation and thus forms a siloxane bond, and in accordance with this, at least a part of the polymerizable organic functional group in the first alkoxysilane is polymerized, thereby providing the antistatic material according to the present invention as a sol solution.

(3) Application of Antistatic Material

The aforementioned sol solution, that is, the antistatic material can cover mainly a solid surface by being applied to the surface, polymerization further advances due to hydrolysis of an unreacted alkoxy group with water in the air and dehydration condensation, a siloxane bond is further formed, and the antistatic material is thus cured, thereby easily forming a transparent antistatic film.

Eventually, an organic-inorganic hybrid structure in which a network of a siloxane skeleton due to polymerization of alkoxy groups, that is, an inorganic material portion, and network due to polymerization of the polymerizable organic functional groups, that is, an organic material portion are physically or chemically bonded is formed, and such an organic-inorganic hybrid structure has durability and transparency caused by the inorganic material portion and adhesiveness and flexibility caused by the organic material portion.

Further, since the polymerizable organic functional group is polymerized directly by the aforementioned ionic compound at the organic material portion, and ion species derived from the ionic compound are taken into the skeleton, the surface resistivity further decreases due to hopping conduction via the ion species. As a result, it is possible to exhibit an excellent antistatic function.

In addition, since an antistatic film according to the preferred embodiment of the present disclosure also exhibits conductivity due to hopping conduction, the antistatic film is hardly affected by humidity unlike an ion conductive antistatic agent in the related art. Further, since both the inorganic material portion and the organic material portion cannot have absorption peaks in a visible light wavelength region, it is possible to exhibit high transparency. As a result, it is possible to obtain an excellent antistatic film that has excellent transparency, flexibility, adhesiveness, and durability and that is hardly affected by humidity.

EXAMPLES

Test Example 1

A test for demonstrating that the polymerizable organic functional group that the first alkoxysilane has can be polymerized by the aforementioned ionic compound will be exemplified.

Figure 2:
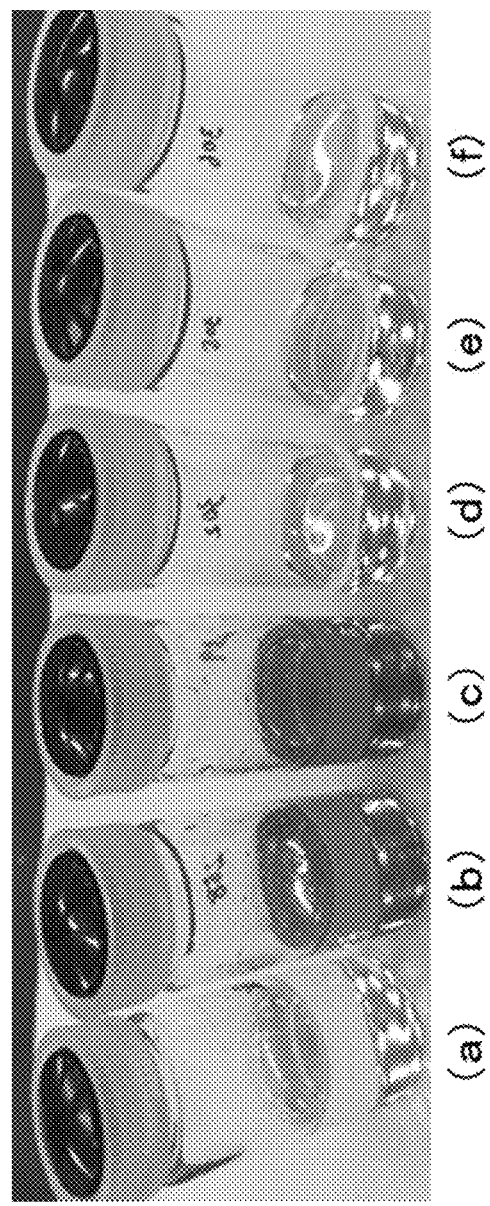
FIG. 2 is a diagram illustrating a state after first or second alkoxysilane and lithium perchlorate are mixed.

FIG. 2 is a diagram illustrating a state after the first or second alkoxysilane and lithium perchlorate were mixed. Results of appearance observation after the following operations are illustrated in photographs (a), (b), (c), (d), (e), and (f) in FIG. 2. 3-glycidoxypropyltrimethoxysilane was used as the first alkoxysilane; methyltrimethoxysilane was used as the second alkoxysilane; lithium perchlorate was used as the ionic compound;

Samples A, B, C, D, E, and F were prepared in the formulations illustrated in Table 1 below; and the samples were left at an ordinary temperature for 120 hours.

Sample A (photograph (a)) is a reference sample that contained only 3-glycidoxypropyltrimethoxysilane as the first alkoxysilane. Samples B and C (photographs (b) and (c)) are samples in which lithium perchlorate as the ionic compound was mixed in 3-glycidoxypropyltrimethoxysilane as the first alkoxysilane. Sample D (photograph (d)) is a reference sample that contained only methyltrimethoxysilane as the second alkoxysilane. Samples E and F (photographs (e) and (f)) are samples in which lithium perchlorate as the ionic compound was mixed with methyltrimethoxysilane as the second alkoxysilane.

TABLE 1

| Name of sample | A | B | C | D | E | F |
| --- | --- | --- | --- | --- | --- | --- |
| 3-glycidoxypropyltri-methoxysilane (ml) | 4.27 | 4.27 | 4.27 | — | — | — |
| Methyltrimethoxysilane (ml) | — | — | — | 2.77 | 2.77 | 2.77 |
| Lithium perchlorate (g) | — | 0.25 | 0.50 | — | 0.25 | 0.50 |
| Heat generation reaction peak temperature (° C.) | — | 183.7 | 165.9 | — | — | — |

As can be understood from FIG. 2, a color change was observed when 3-glycidoxypropyltrimethoxysilane was used as the first alkoxysilane and lithium perchlorate was added (photograph (b)), and the degree of color change further increased in a case in which the amount of lithium perchlorate added increased (photograph (c)). Meanwhile, such color change was not observed, and there was no dependence on the amount of lithium perchlorate added in a case in which methyltrimethoxysilane was used as the second alkoxysilane (photographs (e) and (f)). These results exhibited that the first alkoxysilane was polymerized in presence of the ionic compound.

Figure 3:
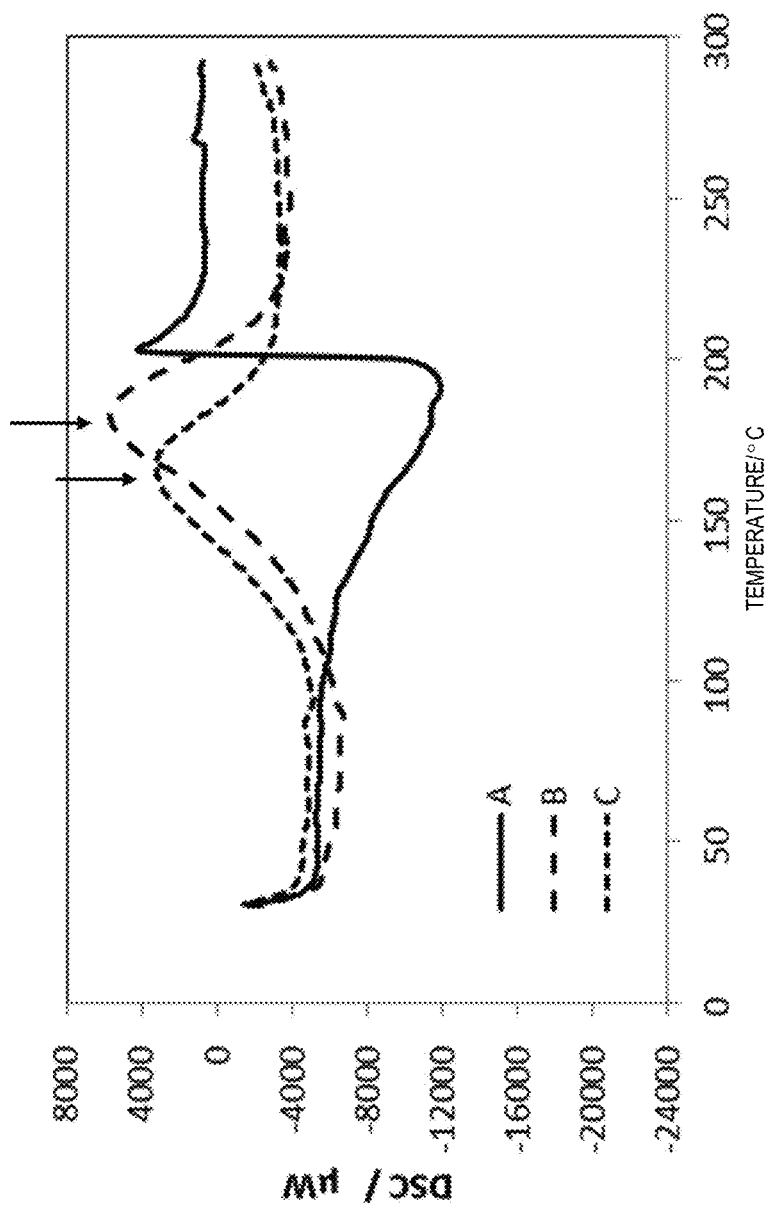
FIG. 3 is a diagram illustrating results of performing differential scanning calorimetry on a sample obtained by mixing 3-glycidoxypropyltrimethoxysilane and lithium perchlorate.
Figure 4:
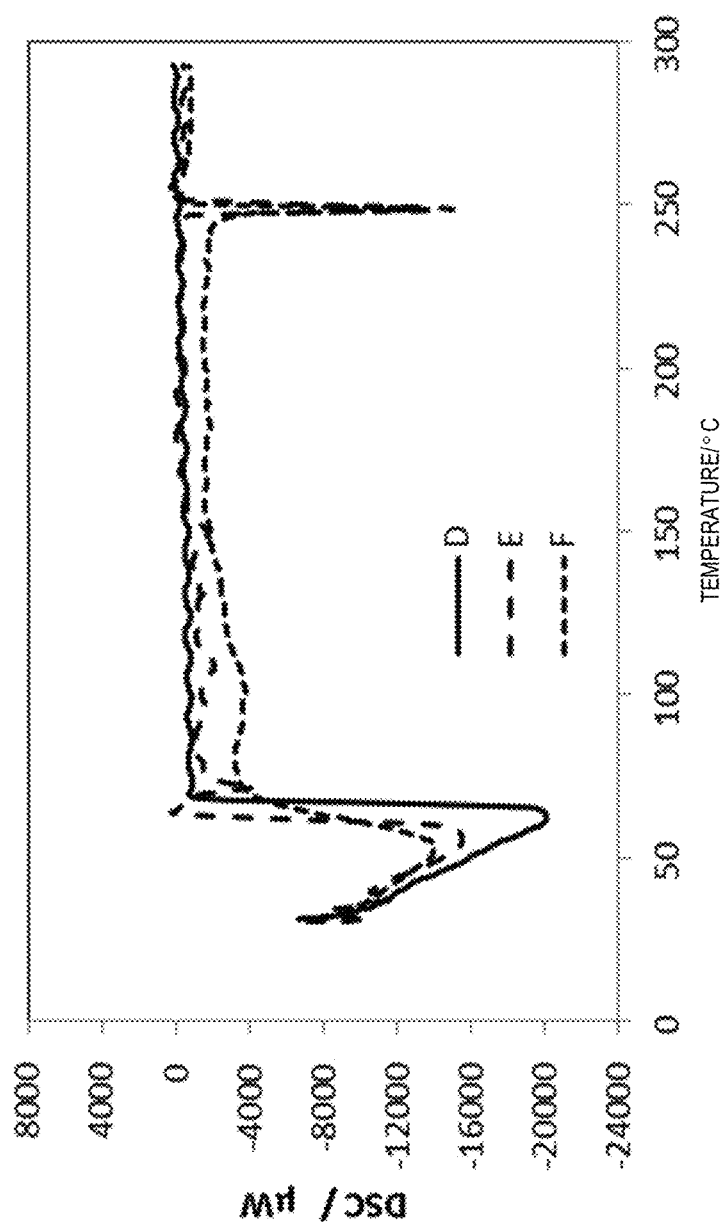
FIG. 4 is a diagram illustrating results of performing differential scanning calorimetry on a sample obtained by mixing methyltrimethoxysilane and lithium perchlorate.

FIG. 3 is a diagram illustrating results of performing differential scanning calorimetry on a sample obtained by mixing 3-glycidoxypropyltrimethoxysilane with lithium perchlorate. FIG. 4 is a diagram illustrating results of performing differential scanning calorimetry on a sample obtained by mixing methyltrimethoxysilane with lithium perchlorate.

FIGS. 3 and 4 illustrate results of performing differential scanning calorimetry analysis and measurement on Samples A to F. Table 1 above illustrates heat generation reaction peak temperatures (° C.) as a result of the differential scanning calorimetry.

It was found from Samples A, B, and C that a heat generation reaction was observed with an increase in temperature and the reaction peak temperatures decreased and the reactivity increased as the amounts of ionic compound added increased in a case in which the first alkoxysilane and the ionic compound were used (FIG. 3, Table 1).

In contrast, no such heat generation reactions were not observed in Samples D, E, and F, and there was no dependence on the amounts of ionic compounds added (FIG. 4, Table 1).

It was also found that viscosity of liquid phases increased as the amounts of ionic compounds added increased in the mixtures of the first alkoxysilane and the ionic compounds.

It was found from the above facts that the first alkoxysilane was polymerized by the ionic compounds.

Although the present disclosure will be described below in more detail on the basis of examples, the present disclosure is not limited to the following examples.

Example 1

Preparation of Antistatic Material (Sol Solution)

A stirrer was placed in a 300 ml glass container, 100 ml of 3-glycidoxypropyltrimethoxysilane as first alkoxysilane, 115 ml of methyltrimethoxysilane as second alkoxysilane, 1.3 ml of hydrochloric acid (concentration normality of 1) as an acidic catalyst, 10.04 g of lithium perchlorate as an ionic compound, and 150 ml of water as a solvent were placed therein and were stirred on a hot stirrer set at 70° C. for 30 minutes under a condition in which the mixture was opened to the atmosphere, thereby preparing a sol solution.

Formation of Antistatic Film (application and Curing of Sol Solution)

The prepared sol solution was applied to a glass substrate with the size of 30 mm×30 mm×1 mm by a spin coater to have a thickness of about 500 μm, was left for 24 hours, and was cured, thereby forming a film.

Example 2

Preparation of Antistatic Material (Sol Solution)

A stirrer was placed in a 300 ml glass container, 97.8 ml of 3-glycidoxypropylmethyldimethoxysilane as first alkoxysilane, 100 ml of methyltrimethoxysilane as second alkoxysilane, 1.3 ml of hydrochloric acid (concentration normality of 1) as an acidic catalyst, 5.02 g of sodium perchlorate as an ionic compound, and 150 ml of water as a solvent were placed therein and were stirred on a hot stirrer set at 70° C. for 30 minutes under a condition in which the mixture was opened to the atmosphere, thereby preparing a sol solution.

Formation of Antistatic Film (Application and Curing of Sol Solution)

The prepared sol solution was manually dropped to a PET film with the size of 30 mm×30 mm×0.2 mm, was uniformly spread to have a thickness of about 500 μm, was left for 24 hours, and was cured, thereby forming a film.

Example 3

Preparation of Antistatic Material (Sol Solution)

A stirrer was placed in a 300 ml glass container, 45 ml of 3-glycidoxypropyltrimethoxysilane and 50 ml of 3-glycidoxypropylmethyldimethoxysilane as first alkoxysilane, 110 ml of methyltrimethoxysilane as second alkoxysilane, 1.3 ml of hydrochloric acid (concentration normality of 1) as an acidic catalyst, 10.04 g of lithium perchlorate as an ionic compound, and 150 ml of water as a solvent were placed therein and were stirred on a hot stirrer set at 70° C. for 30 minutes under a condition in which the mixture was opened to the atmosphere, thereby preparing a sol solution.

Formation of Antistatic Film (Application and Curing of Sol Solution)

The prepared sol solution was manually dropped to a PET film with the size of 30 mm×30 mm×0.2 mm, was uniformly spread to have a thickness of about 500 μm, was left for 24 hours, and was cured, thereby forming a film.

Example 4

Preparation of Antistatic Material (Sol Solution)

A stirrer was placed in a 300 ml glass container, 95 ml of 3-glycidoxypropyltrimethoxysilane as first alkoxysilane, 50 ml of methyltrimethoxysilane and 50 ml of dimethyldimethoxysilane as second alkoxysilane, 1.3 ml of hydrochloric acid (concentration normality of 1) as an acidic catalyst, 10.04 g of lithium perchlorate as an ionic compound, and 120 ml of water as a solvent were placed therein and were stirred on a hot stirrer set at 70° C. for 30 minutes under a condition in which the mixture was opened to the atmosphere, thereby preparing a sol solution.

Formation of Antistatic Film (Application and Curing of Sol Solution)

The prepared sol solution was applied to a glass substrate with the size of 30 mm×30 mm×1 mm by a spin coater to have a thickness of about 500 μm, was left for 24 hours, and was cured, thereby forming a film.

Example 5

Preparation of Antistatic Material (Sol Solution)

A stirrer was placed in a 300 ml glass container, 95 ml of vinyltrimethoxysilane as first alkoxysilane, 100 ml of methyltrimethoxysilane as second alkoxysilane, 1.3 ml of hydrochloric acid (concentration normality of 1) as an acidic catalyst, 5.0 g of n-butyllithium as an ionic compound, and 150 ml of water as a solvent were placed therein and were stirred on a hot stirrer set at 70° C. for 30 minutes under a condition in which the mixture was opened to the atmosphere, thereby preparing a sol solution.

Formation of Antistatic Film (Application and Curing of Sol Solution)

The prepared sol solution was applied to a glass substrate with the size of 30 mm×30 mm×1 mm by a spin coater to have a thickness of about 500 μm, was left for 24 hours, and was cured, thereby forming a film.

Example 6

Preparation of Antistatic Material (Sol Solution)

A stirrer was placed in a 300 ml glass container, 100 ml of 3-glycidoxypropyltrimethoxysilane as first alkoxysilane, 115 ml of methyltrimethoxysilane as second alkoxysilane, 1.3 ml of hydrochloric acid (concentration normality of 1) as an acidic catalyst, 7.0 g of sodium perchlorate as an ionic compound, and 150 ml of water as a solvent were placed therein and were stirred on a hot stirrer set at 70° C. for 30 minutes under a condition in which the mixture was opened to the atmosphere, thereby preparing a sol solution.

Formation of Antistatic Film (Application and Curing of Sol Solution)

The prepared sol solution was applied to a glass substrate with the size of 30 mm×30 mm×1 mm by a spin coater to have a thickness of about 500 μm, was left for 24 hours, and was cured, thereby forming a film.

Example 7

Preparation of Antistatic Material (Sol Solution)

A stirrer was placed in a 300 ml glass container, 100 ml of 3-glycidoxypropyltrimethoxysilane as first alkoxysilane, 115 ml of methyltrimethoxysilane as second alkoxysilane, 1.3 ml of hydrochloric acid (concentration normality of 1) as an acidic catalyst, 7.0 g of potassium perchlorate as an ionic compound, and 150 ml of water as a solvent were placed therein and were stirred on a hot stirrer set at 70° C. for 30 minutes under a condition in which the mixture was opened to the atmosphere, thereby preparing a sol solution.
Formation of Antistatic Film (Application and Curing of Sol Solution)
The prepared sol solution was applied to a glass substrate with the size of 30 mm×30 mm×1 mm by a spin coater to have a thickness of about 500 μm, was left for 24 hours, and was cured, thereby forming a film.

Example 8

Preparation of Antistatic Material (Sol Solution)
A stirrer was placed in a 300 ml glass container, 90 ml of 2-(3,4-epoxycyclohexyl)ethyltrimethoxysilane as first alkoxysilane, 120 ml of methyltrimethoxysilane as second alkoxysilane, 1.3 ml of hydrochloric acid (concentration normality of 1) as an acidic catalyst, 7.0 g of potassium perchlorate as an ionic compound, and 150 ml of water as a solvent were placed therein and were stirred on a hot stirrer set at 70° C. for 30 minutes under a condition in which the mixture was opened to the atmosphere, thereby preparing a sol solution.
Formation of Antistatic Film (Application and Curing of Sol Solution)
The prepared sol solution was applied to a glass substrate with the size of 30 mm×30 mm×1 mm by a spin coater to have a thickness of about 500 μm, was left for 24 hours, and was cured, thereby forming a film.

Comparative Example 1

Preparation of Antistatic Material (Sol Solution)
A stirrer was placed in a 300 ml glass container, first alkoxysilane was not blended, 100 ml of phenyltrimethoxysilane and 115 ml of methyltrimethoxysilane as second alkoxysilane, 1.3 ml of hydrochloric acid (concentration normality of 1) as an acidic catalyst, 10.04 g of lithium perchlorate as an ionic compound, and 150 ml of water as a solvent were placed therein and were stirred on a hot stirrer set at 70° C. for 30 minutes under a condition in which the mixture was opened to the atmosphere, thereby preparing a solution.
Formation of Film
The prepared solution was applied to a glass substrate with the size of 30 mm×30 mm×1 mm by a spin coater to have a thickness of about 500 μm, was left for 24 hours, and was cured, thereby forming a film.

Comparative Example 2

Preparation of Antistatic Material (Sol Solution)
A stirrer was placed in a 300 ml glass container, 100 ml of 3-glycidoxypropyltrimethoxysilane as first alkoxysilane, 115 ml of methyltrimethoxysilane as second alkoxysilane, 1.3 ml of hydrochloric acid (concentration normality of 1) as an acidic catalyst, no ionic compound, and 150 ml of water as a solvent were placed therein and were stirred on a hot stirrer set at 70° C. for 30 minutes under a condition in which the mixture was opened to the atmosphere, thereby preparing a solution.
Formation of Film
The prepared solution was applied to a glass substrate with the size of 30 mm×30 mm×1 mm by a spin coater to have a thickness of about 500 μm, was left for 24 hours, and was cured, thereby forming a film.

Comparative Example 3

Preparation of Antistatic Material (Sol Solution)
A stirrer was placed in a 300 ml glass container, 97.8 ml of 3-glycidoxypropylmethyldimethoxysilane as first alkoxysilane, 100 ml of methyltrimethoxysilane as second alkoxysilane, 1.3 ml of hydrochloric acid (concentration normality of 1) as an acidic catalyst, no ionic compound, 5.02 g of triphenylphosphine as a curing accelerator, and 150 ml of water as a solvent were placed therein and were stirred on a hot stirrer set at 70° C. for 30 minutes under a condition in which the mixture was opened to the atmosphere, thereby preparing a sol solution.
Formation of Film
The prepared sol solution was applied to a glass substrate with the size of 30 mm×30 mm×1 mm by a spin coater to have a thickness of about 500 μm, was left for 24 hours, and was cured, thereby forming a film.
The following measurement was performed on the cured films obtained in the examples and the comparative examples, and the results are illustrated in Table 2 below.

TABLE 2

| | Raw material | Example 1 | Example 2 | Example 3 | Example 4 | Example 5 | Example 6 |
|---|---|---|---|---|---|---|---|
| First alkoxysilane (ml) | 3-glycidoxypropyl-trimethoxysilane | 100 | — | 45 | 95 | — | 100 |
| | 3-glycidoxypropyl-methyldimethoxysilane | — | 97.8 | 50 | — | — | — |
| | 2-(3,4-epoxycyclohexyl)ethyltrimethoxysilane | — | — | — | — | — | — |
| | Vinyltrimethoxysilane | — | — | — | — | 95 | — |
| Second alkoxysilane (ml) | Methyltrimethoxysilane | 115 | 100 | 110 | 50 | 100 | 115 |
| | Dimethyldimethoxysilane | — | — | — | — | 50 | — |
| | Phenyltrimethoxysilane | — | — | — | — | — | — |
| | Hydrochloric acid (ml) | 1.3 | 1.3 | 1.3 | 1.3 | 1.3 | 1.3 |
| Ionic compound (g) | Lithium perchlorate | 10.04 | — | 10.04 | 10.04 | — | — |
| | Sodium perchlorate | — | 5.02 | — | — | — | 7.00 |
| | Potassium perchlorate | — | — | — | — | — | — |
| | n-butyl lithium | — | — | — | — | 5.0 | — |
| | Triphenylphosphine (g) | — | — | — | — | — | — |
| | Water (ml) | 150 | 150 | 150 | 120 | 150 | 150 |
| Surface resistivity (Ω/square) | Humidity of 30% | $2.5 \times 10^7$ | $3.7 \times 10^8$ | $5.4 \times 10^7$ | $1.1 \times 10^8$ | $5.7 \times 10^9$ | $1.1 \times 10^9$ |
| | Determination | a | b | a | b | b | b |
| | Humidity of 50% | $1.8 \times 10^7$ | $3.4 \times 10^8$ | $5.5 \times 10^7$ | $9.8 \times 10^7$ | $3.2 \times 10^9$ | $8.9 \times 10^8$ |
| | Determination | a | b | a | a | b | b |
| | Humidity of 70% | $1.5 \times 10^7$ | $3.7 \times 10^8$ | $6.5 \times 10^7$ | $5.6 \times 10^7$ | $4.4 \times 10^9$ | $9.9 \times 10^8$ |
| | Determination | a | b | a | a | b | b |

TABLE 2-continued

| | | | | | | | |
|---|---|---|---|---|---|---|---|
| Comprehensive determination of surface resistivity | | a | b | a | b | b | b |
| Tensile elasticity (MPa) | Measured value | 66 | 35 | 45 | 42 | 74 | 57 |
| | Determination | b | a | a | a | b | b |
| Light transmittance (550 nm) (%) | Measured value | 91 | 92 | 91 | 90 | 88 | 90 |
| | Determination | a | a | a | a | b | a |
| Comprehensive determination | | A | A | A | A | B | B |

| | Raw material | Example 7 | Example 8 | Comparative Example 1 | Comparative Example 2 | Comparative Example 3 |
|---|---|---|---|---|---|---|
| First alkoxysilane (ml) | 3-glycidoxypropyl-trimethoxysilane | 100 | — | — | 100 | — |
| | 3-glycidoxypropyl-methyldimethoxysilane | — | — | — | — | 97.8 |
| | 2-(3,4-epoxycyclohexyl)ethyltrimethoxysilane | — | 90 | — | — | — |
| | Vinyltrimethoxysilane | — | — | — | — | — |
| Second alkoxysilane (ml) | Methyltrimethoxysilane | 115 | 120 | 115 | 115 | 100 |
| | Dimethyldimethoxysilane | — | — | — | — | — |
| | Phenyltrimethoxysilane | — | — | 100 | — | — |
| | Hydrochloric acid (ml) | 1.3 | 1.3 | 1.3 | 1.3 | 1.3 |
| Ionic compound (g) | Lithium perchlorate | — | — | 10.04 | — | — |
| | Sodium perchlorate | — | — | — | — | — |
| | Potassium perchlorate | 7.00 | 7.00 | — | — | — |
| | n-butyl lithium | — | — | — | — | — |
| | Triphenylphosphone (g) | — | — | — | — | 5.02 |
| Water (ml) | | 150 | 150 | 150 | 150 | 150 |
| Surface resistivity (Ω/square) | Humidity of 30% | $6.7 \times 10^8$ | $5.9 \times 10^7$ | $>1.0 \times 10^{10}$ | $>1.0 \times 10^{10}$ | $>1.0 \times 10^{10}$ |
| | Determination | b | a | c | c | c |
| | Humidity of 50% | $6.6 \times 10^8$ | $1.2 \times 10^8$ | $3.3 \times 10^9$ | $>1.0 \times 10^{10}$ | $>1.0 \times 10^{10}$ |
| | Determination | b | b | b | c | c |
| | Humidity of 70% | $3.4 \times 10^8$ | $7.4 \times 10^7$ | $8.5 \times 10^8$ | $>1.0 \times 10^{10}$ | $>1.0 \times 10^{10}$ |
| | Determination | b | a | b | c | c |
| Comprehensive determination of surface resistivity | | b | b | c | c | c |
| Tensile elasticity (MPa) | Measured value | 61 | 69 | 41 | 36 | 39 |
| | Determination | b | b | a | a | a |
| Light transmittance (550 nm) (%) | Measured value | 91 | 92 | 90 | 89 | 91 |
| | Determination | a | a | a | b | a |
| Comprehensive determination | | B | B | C | C | C |

(Surface Resistivity)

The surface resistivity of the cured films obtained in the examples and the comparative examples was measured by maintaining a constant temperature and changing humidity (30%, 50%, and 70%).

<Determination Criteria of Surface Resistivity at Each Humidity>

Equal to or greater than $1.0 \times 10^5$ Ω/square and less than $1.0 \times 10^8$ Ω/square:

This was evaluated as a value indicating that it was possible to most preferably exhibit antistatic properties, and was represented by a symbol "a".

Equal to or greater than $1.0 \times 10^8$ Ω/square and less than $1.0 \times 10^{10}$ Ω/square: This was evaluated as a value indicating that it was possible to exhibit antistatic properties, and was represented by a symbol "b".

Equal to or Greater Than $1.0 \times 10^{10}$ Ω/square:

This was evaluated as a value indicating that it was difficult to exhibit antistatic properties, and was represented by a symbol "c".

As comprehensive determinations of the surface resistivity, a film that was evaluated as "a" in all the aforementioned determinations of the surface resistivity at each humidity was represented by a symbol "a", a film that included one or more "c" in the aforementioned determinations was represented by a symbol "c", and a film that was evaluated as "b" in all the aforementioned determinations or was evaluated as "a" and "b" with no "c" was represented by a symbol "b".

(Tensile Elasticity)

The sol solutions or the solutions prepared in the aforementioned examples and comparative examples were manually potted and cured in polytetrafluoroethylene molds, thereby producing molded articles with a size of 5 mm×20 mm×1 mm. Tensile elasticity of the molded article was measured.

<Determination Criteria of Tensile Elasticity>

Equal to or Greater Than 30 MPa and Less Than 50 MPa:

This was evaluated as a value indicating particularly excellent flexibility, and was represented by a symbol "a".

Equal to or Greater Than 50 MPa and Less Than 100 MPa:

This was evaluated as a value indicating excellent flexibility, and was represented by a symbol "b".

Equal to or Greater Than 100 MPa:

This was evaluated as a value indicating poor flexibility, and was represented by a symbol "c".

(Light Transmittance)

Transmittance of light with a wavelength of 550 nm was measured with reference of glass for the films coated with glass and with reference of PET films for the films coated with the PET films in the aforementioned examples and the comparative examples.

<Determination Criteria of Light Transmittance>
Equal to or Greater Than 90%:
   This was evaluated as a value indicating significantly high transparency and was represented by a symbol "a".
Equal to or Greater Than 85% and Less Than 90%:
   This was evaluated as a value indicating high transparency and was represented by a symbol "b".
Less Than 85%:
   This was evaluated as a value indicating poor transparency and was represented by a symbol "c".
(Comprehensive Determination)
   In comprehensive determinations of the surface resistivity, determinations of tensile elasticity, and determinations of light transmittance in the examples and the comparative examples, a film that included "c" in at least one determination was represented as a symbol "C", a film that included no "c" and included "a" in two or more determinations was represented as a symbol "A", and a film that included no "c" and included "a" in one or less determination was represented as a symbol "B".

It is possible to recognize the following facts from the results illustrated in Table 2.

It was found from the results of Examples 1 to 8 according to the present disclosure that according to the antistatic materials of the present disclosure, it was possible to obtain the antistatic films that had surface resistivity that was hardly affected by humidity and had an excellent antistatic function (surface resistivity of equal to or greater than $1.0 \times 10^5 \Omega$/square and less than $1.0 \times 10^{10} \Omega$/square) even in a case in which the humidity was low (humidity of 30%). It was found from the results of Examples 1 to 8 according to the present disclosure that according to the antistatic materials of the present disclosure, it was possible to obtain the antistatic films that had excellent flexibility (tensile elasticity of equal to or greater than 30 MPa and less than 100 MPa) and high transparency (light transmittance of equal to or greater than 85%).

Here, some antistatic material using a surfactant was not able to sufficiently exhibit an antistatic function in some cases since the antistatic function was gradually lost due to temporal deterioration of the surfactant. However, since no surfactant was used in the antistatic materials according to the present disclosure, it was possible to suppress deterioration of the antistatic function caused by the temporal deterioration of the surfactant.

In a case of some antistatic material using fine particles of oxide, light absorption and light scattering due to the fine particles increased, the transmittance of light that passed through the antistatic material decreased, and transparency deteriorated if it was attempted to improve the antistatic function by increasing the concentration of the fine particles. However, since no fine particles of oxide were used in the antistatic materials according to the present disclosure, it was possible to suppress deterioration of the transmittance of light due to the fine particles of oxide.

It was found from the results of Examples 1 to 4, Example 6, and Example 7 that antistatic materials with particularly high transparency (light transmittance of 90% or greater) that were hardly affected by humidity (a change in surface resistivity in response to a change in humidity was small) tended to be obtained if the first alkoxysilane containing a glycidoxy group was used.

It was found from the results of Example 8 that an antistatic film with particularly high transparency (light transmittance of 90% or greater) that was hardly affected by humidity (a change in surface resistivity in response to a change in humidity was small) was obtained in a case in which the first alkoxysilane containing an organic functional group with a cyclic ether structure was used.

It was found from comparison between Example 1 and Example 3 and from comparison between Example 1 and Example 4 that it was possible to further reduce the tensile elasticity (tensile elasticity of equal to or greater than 30 MPa and less than 50 MPa) and to obtain antistatic films with particularly excellent flexibility by mixing alkoxysilane containing 2 or 3 alkoxy groups as described in Examples 3 and 4.

It was found from comparison between Example 1 and Comparative Example 1 that it was necessary to polymerize the polymerizable organic functional group in the first alkoxysilane by the ionic compound as described in Example 1 in order to obtain an antistatic film that was hardly affected by humidity (a change in surface resistivity relative to a change in humidity was small).

It was found from comparison between Example 1 and Comparative Example 2 that it was possible to form an antistatic film with low surface resistivity (surface resistivity of less than $1.0 \times 10^{10} \Omega$/square) by the ionic compound polymerizing the polymerizable organic functional group in the first alkoxysilane as described in Example 1.

It was found from comparison between Example 2 and Comparative Example 3 that it was possible to form an antistatic film with low surface resistivity (surface resistivity of less than $1.0 \times 10^{10} \Omega$/square) by the ionic compound polymerizing the polymerizable organic functional group in the first alkoxysilane as described in Example 2.

Here, some antistatic materials that exhibit antistatic functions by conductivity applied by ion conducting materials are easily affected by humidity and cannot stably exhibit an antistatic function in some cases. However, the antistatic material according to Examples 1 and 2 have an antistatic function that is hardly affected by humidity since the ionic compound is made to polymerize the polymerizable organic functional group in the first alkoxysilane and a structure in which the ionic substance has been taken into a polymerization chain.

INDUSTRIAL APPLICABILITY

It is possible to easily form a transparent antistatic film from the antistatic material according to the present invention merely by applying the antistatic material to a base body such as a solid, and to thereby widely utilize the antistatic material according to the present disclosure in a variety of fields. Since the surface resistivity of the antistatic film that can be formed from the antistatic material according to the present disclosure is hardly affected by humidity, it is possible to stably and widely utilize the antistatic film in a variety of fields. It is possible to form a transparent and hard film that has an excellent antistatic function from the antistatic material according to the present disclosure, and to thereby also use the antistatic material according to the present disclosure as a coating material for forming an antifouling film, for example.

The invention claimed is:
1. An antistatic material which is prepared from:
   a mixture comprising:
      first alkoxysilane that contains at least one alkoxy group and at least one polymerizable organic functional group, wherein the polymerizable organic functional group in the first alkoxysilane contains a double bond;

second alkoxysilane that contains at least one alkoxy group and does not contain a polymerizable organic functional group;
a solvent;
an acidic catalyst; and
at least one selected from the group consisting of lithium perchlorate, sodium perchlorate, potassium perchlorate, and butyl lithium.

2. The antistatic material of claim 1,
wherein in the mixture, at least one of polymerizable organic functional groups in the first alkoxysilane is polymerizable by the at least one selected from the group consisting of lithium perchlorate, sodium perchlorate, potassium perchlorate, and butyl lithium.

3. The antistatic material of claim 1,
wherein in the mixture, at least one of alkoxy groups in the first alkoxysilane is polymerizable by a siloxane bond, and at least one of alkoxy groups in the second alkoxysilane is polymerizable by a siloxane bond.

4. The antistatic material of claim 1,
wherein the polymerizable organic functional group in the first alkoxysilane contains a vinyl group.

5. The antistatic material of claim 1,
wherein the solvent is water.

6. A method for producing the antistatic material of claim 1, comprising:
mixing the first alkoxysilane, the second alkoxysilane, the catalyst, the solvent, and the at least one selected from the group consisting of lithium perchlorate, sodium perchlorate, potassium perchlorate, and butyl lithium.

7. The method for producing the antistatic material of claim 6,
wherein the mixing is performed while the mixture is heated.

8. An antistatic film comprising antistatic material of claim 1.

9. An antistatic material which is prepared from:
a mixture comprising:
first alkoxysilane that contains at least one alkoxy group and at least one polymerizable organic functional group;
second alkoxysilane that contains at least one alkoxy group and does not contain a polymerizable organic functional group;
a solvent;
an acidic catalyst; and
at least one selected from the group consisting of lithium perchlorate, sodium perchlorate, potassium perchlorate, and butyl lithium.

10. The antistatic material of claim 9,
wherein in the mixture, at least one of polymerizable organic functional groups in the first alkoxysilane is polymerizable by the at least one selected from the group consisting of lithium perchlorate, sodium perchlorate, potassium perchlorate, and butyl lithium.

11. The antistatic material of claim 9,
wherein in the mixture, at least one of alkoxy groups in the first alkoxysilane is polymerizable by a siloxane bond, and at least one of alkoxy groups in the second alkoxysilane is polymerizable by a siloxane bond.

12. The antistatic material of claim 9, wherein the polymerizable organic functional group in the first alkoxysilane contains a cyclic ether bond.

13. The antistatic material of claim 9,
wherein the polymerizable organic functional group in the first alkoxysilane contains a glycidoxy group.

14. The antistatic material of claim 9,
wherein the solvent is water.

15. A method for producing the antistatic material of claim 9, comprising:
mixing the first alkoxysilane, the second alkoxysilane, the catalyst, the solvent, and the at least one selected from the group consisting of lithium perchlorate, sodium perchlorate, potassium perchlorate, and butyl lithium.

16. The method for producing the antistatic material of claim 15,
wherein the mixing is performed while the mixture is heated.

17. The antistatic material of claim 9, wherein the second alkoxysilane that contains at least one alkoxy group and does not contain a polymerizable organic functional group is represented by the following Formula (II):

$(R^4O)_g(R^5O)_h(R^6O)_iSi(P)_j(Q)_k(R)_l$ wherein
$R^4O$, $R^5O$, and $R^6O$ each independently is an alkoxy group,
P, Q, and R each independently is a non-polymeric group,
g, h, i, j, k, and l each independently is any of integers 0, 1, 2, 3, and 4, but j, k, and l are not integer 4 in any cases,
g+h+i is any of integers 1, 2, and 3,
j+k+l is any of integers 1, 2, and 3, and
g+h+i+j+k+l is an integer 4.

18. The antistatic material of claim 9, wherein the second alkoxysilane that contains at least one alkoxy group and does not contain a polymerizable organic functional group is selected from the group consisting of methyltrimethoxysilane, dimethyldimethoxysilane, and phenyltrimethoxysilane.

19. The antistatic material of claim 9, wherein the antistatic materials do not contain oxide fine particles.

* * * * *